(12) United States Patent
Raju et al.

(10) Patent No.: US 8,644,037 B2
(45) Date of Patent: Feb. 4, 2014

(54) AC-AC CONVERTER WITH HIGH FREQUENCY LINK

(75) Inventors: Ravisekhar Nadimpalli Raju, Clifton Park, NY (US); Richard S. Zhang, Rexford, NY (US); Ljubisa Dragolijub Stevanovic, Clifton Park, NY (US); Jeffrey Neal Slotnick, Niskayuna, NY (US); Robert Louis Steigerwald, Burnt Hills, NY (US); Luis Jose Garces, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1256 days.

(21) Appl. No.: 12/173,549

(22) Filed: Jul. 15, 2008

(65) Prior Publication Data

US 2010/0014325 A1   Jan. 21, 2010

(51) Int. Cl.
*H02M 5/45* (2006.01)
*H02M 7/00* (2006.01)

(52) U.S. Cl.
USPC .............................................. 363/37; 363/65

(58) Field of Classification Search
USPC ......................................... 363/34, 35, 37, 65
See application file for complete search history.

(56) References Cited

U.S. PATENT DOCUMENTS

| | | | |
|---|---|---|---|
| 3,517,300 A | 6/1970 | McMurray | |
| 4,894,763 A | 1/1990 | Ngo | |
| 5,293,111 A | 3/1994 | Weinberg | |
| 5,598,326 A | 1/1997 | Liu et al. | |
| 5,943,229 A | 8/1999 | Sudhoff | |
| 6,396,718 B1 | 5/2002 | Ng et al. | |
| 6,879,062 B2 | 4/2005 | Oates | |
| 7,499,291 B2* | 3/2009 | Han | 363/17 |
| 7,679,941 B2* | 3/2010 | Raju et al. | 363/37 |
| 7,787,270 B2 | 8/2010 | Raju et al. | |
| 2002/0176265 A1 | 11/2002 | Oates | |
| 2006/0233000 A1 | 10/2006 | Akagi | |
| 2006/0245222 A1* | 11/2006 | Nojima | 363/132 |

FOREIGN PATENT DOCUMENTS

WO    0171897    9/2001

OTHER PUBLICATIONS

L. Heinemann, "An Actively Cooled High Power, High Frequency Transformer with High Insulation Capability," IEEE, pp. 352-357, 2002.

InnoTrans 2004 Report, B2B Magazine for Railway Technology, No. 2, 7th annual set, pp. 1-8, Sep. 2003.

A. Rufer et al., "Configurable Front-End Converters for Multicurrent Locomotives Operated on 16 2/3 Hz AC and 3 kV DC Systems," IEEE Transactions on Power Electronics, vol. 18, No. 8, pp. 1186-1193, Sep. 2003.

(Continued)

Primary Examiner — Jessica Han
(74) Attorney, Agent, or Firm — Scott J. Asmus

(57) ABSTRACT

An AC-AC Converter for an AC source which in one embodiment has a first rectifier section rectifying the AC source into a first pulsed DC link voltage signal and a high frequency modulating section coupled to the first pulsed DC link voltage signal and producing a high frequency AC voltage signal. A high frequency transformer is coupled to the high frequency AC voltage signal producing a transformed high frequency AC signal. There is a second rectifier section coupled to the transformed high frequency AC signal and producing a second pulsed DC voltage signal and an unfolder section coupled to the second pulsed DC voltage signal and producing an output AC signal.

29 Claims, 13 Drawing Sheets

(56) References Cited

OTHER PUBLICATIONS

H. Krishnaswami et al., "Control of high-frequency AC link electronic transformer," IEE Proc.-Electr. Power Application, vol. 152, No. 3, May 2005, pp. 509-516.
N. R. Raju, "A DC Link-Modulated Three-Phase Converter," Silicon Power Corporation, pp. 2181-2185, IEEE 0-7803-7116-X, 2001.
T. Kjellqvist et al., "Design Considerations for a Medium Frequency Transformer in a Line Side Power Conversion System," 35th Annual IEEE Power Electronics Specialists Conference, 2004, pp. 704-710.
S.R. Narayana Prakash et al., A Direct AC/AC Bi-Directional Power Converter with High-Frequency Link and Simple PWM Control, IEEE 0-7803-3773-5/97, 1997, pp. 869-875.
M. Ferch, "Light Transformers for Kilowatt SMPS Based on Nanocrystalline Softmagnetic Cores," Power Electronics and Variable Speed Drives, IEE Conference Publication No. 456, Sep. 21-23, 1998. pp. 411-415.
M. Carpita et al., "Medium Frequency Transformer for Traction Applications making use of Multilevel converter: Small Scale Prototype Test Results", International Symposium on Power Electronics, Electrical Drives, Automation and Motion, SPEEDAM 2006, IEEE 2006, pp. S2-17-S2-22.
Jih-Sheng Lai et al., "Multilevel Intelligent Universal Transformer for Medium Voltage Applications," IEEE 0-7803-9208-6, 2005, pp. 1893-1899.
S.M. Tenconi et al., "Multilevel Voltage Source Converters for Medium Voltage Adjustable Speed Drives," IEEE Catalog No. 95TH8081, pp. 91-98.
J. Bordonau et al., "A New Single-Phase HF-Link Multilevel Inverter," IEEE 0-7803-9033-4, 2005. pp. 237-243.
A. Akdag et al., "Overlap Time and Voltage Drop Compensation in an AC/AC Converter," IEEE 0-7803-7883-0, 2003, pp. 205-212.
B. Engel, "15 kV/16.7 Hz Energy Supply System with Medium Frequency Transformer and 6.5 kV IGBTs in Resonant Operation," EPE 2003-Toulouse, pp. 1-10.
I.S. Roth et al, "Solid-State High Frequency Power Converter", Diversified Technologies, Inc., Bedford, MA, pp. 1-5.
Alstom Transport, "eTransformer to Revolutionize train design", @Transport W.C.R.R., retrieved at http://www.webmag.transport.alstom.com/eMag/externe/internatioanl/UK/WCRR/2003/1/177.asp on Jan. 18, 2007.

* cited by examiner

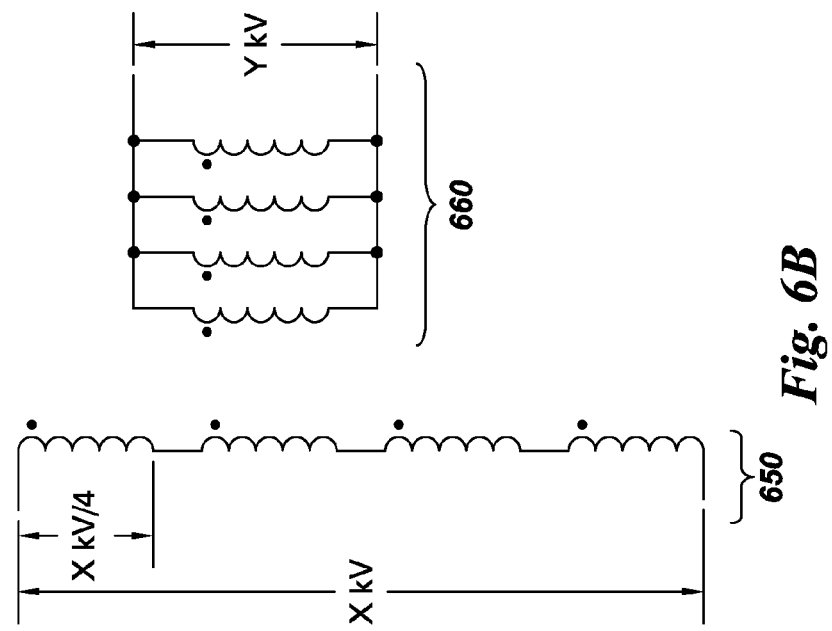
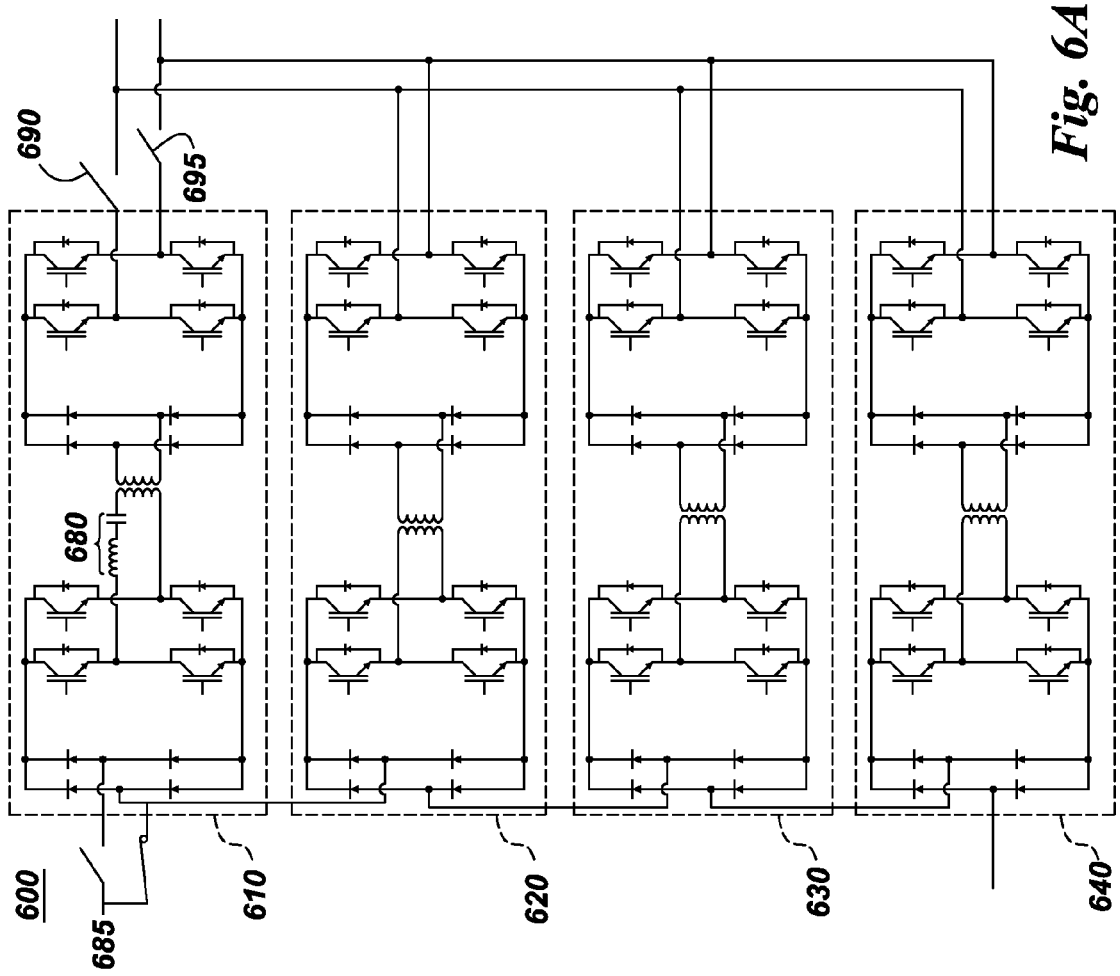
Fig. 6A
Fig. 6B 705  715  710

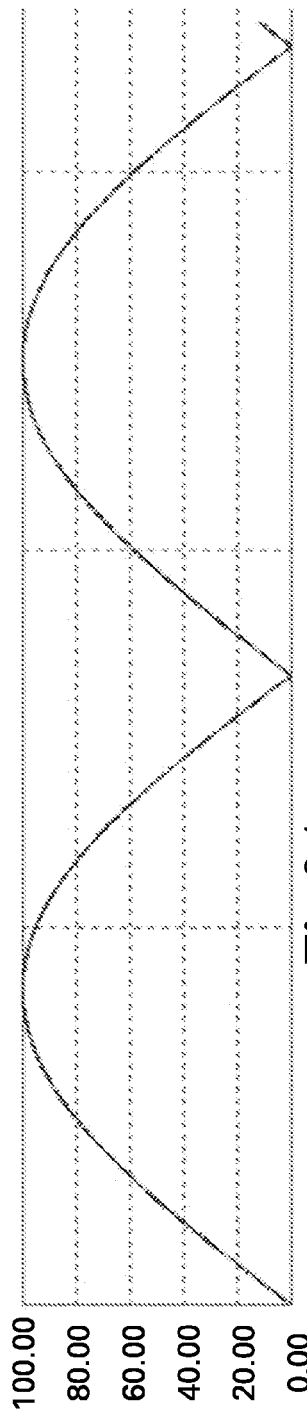
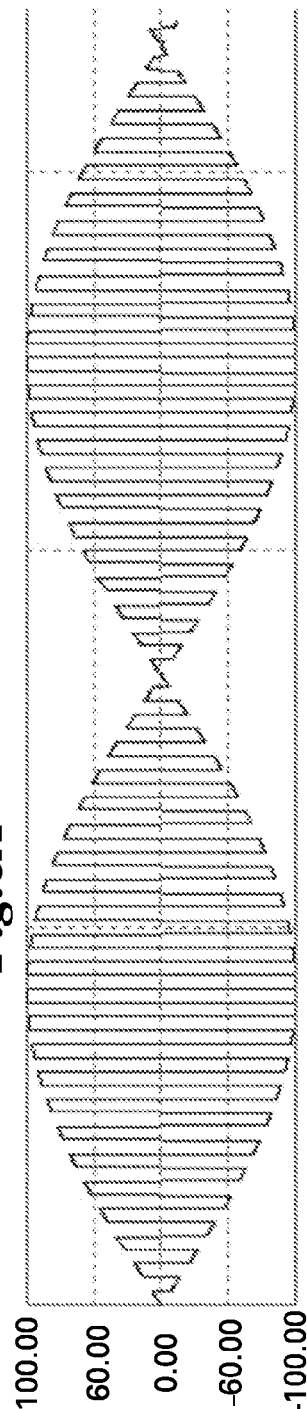
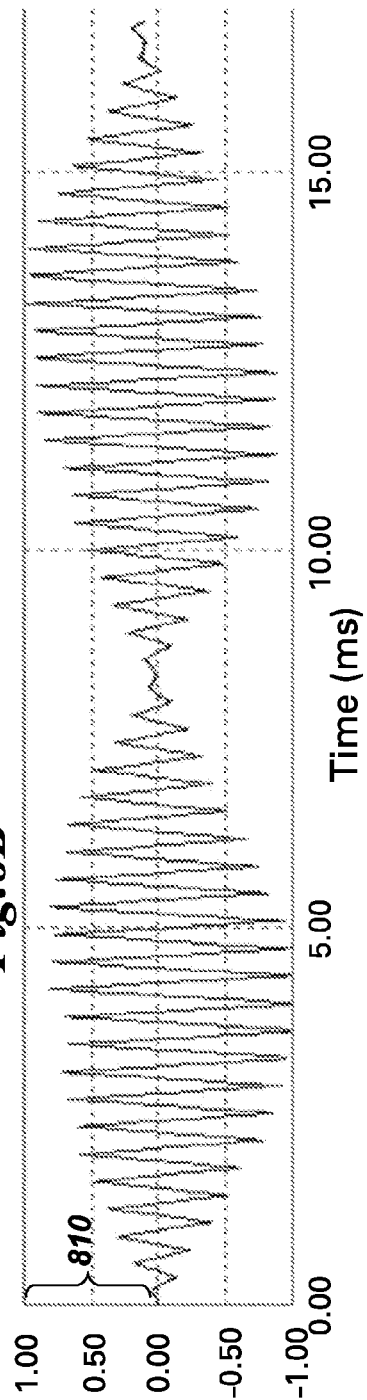
Fig.8A
Fig.8B
Fig.8C

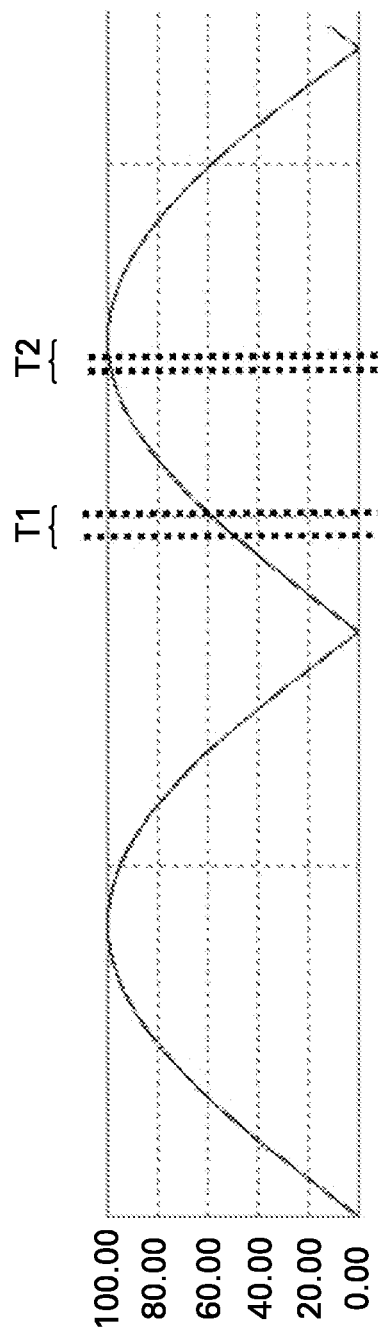
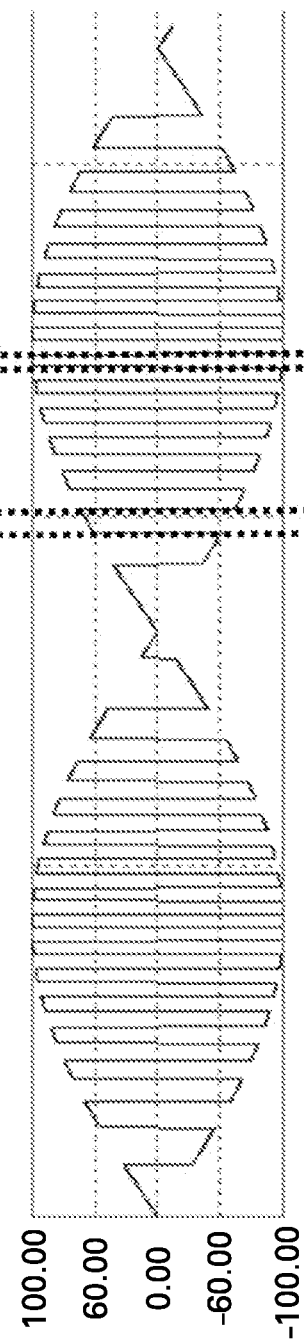
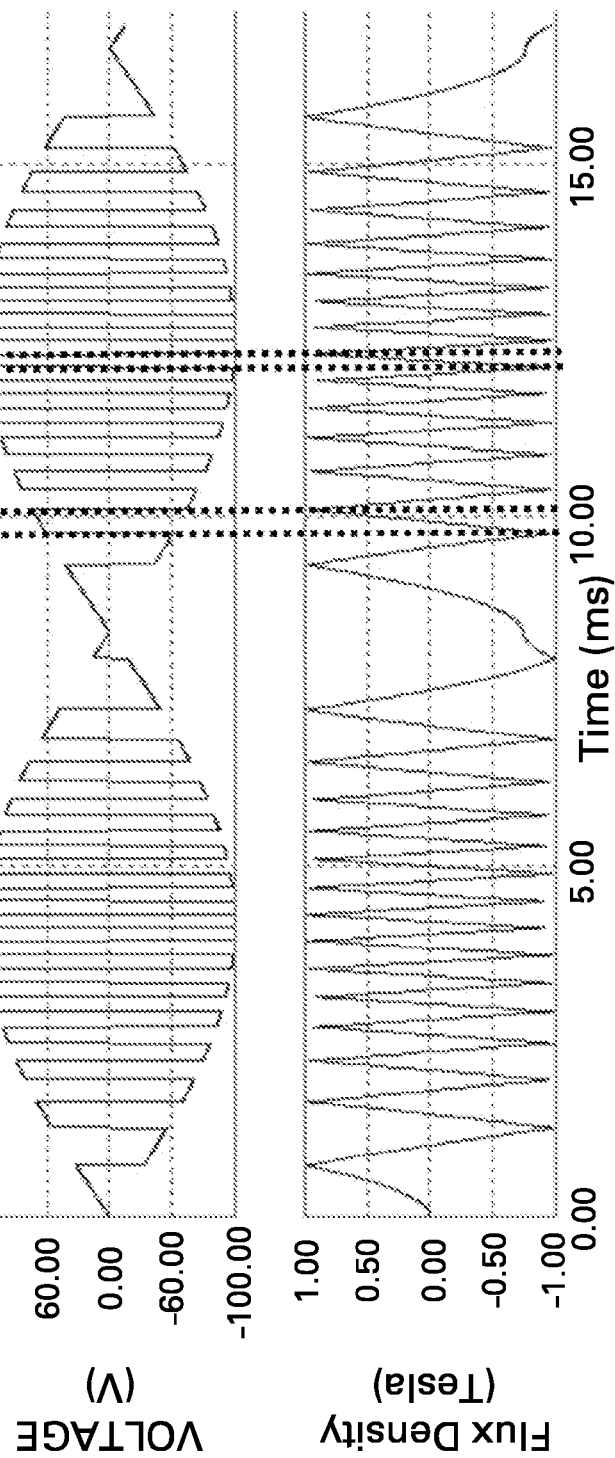
Fig. 9A
Fig. 9B
Fig. 9C

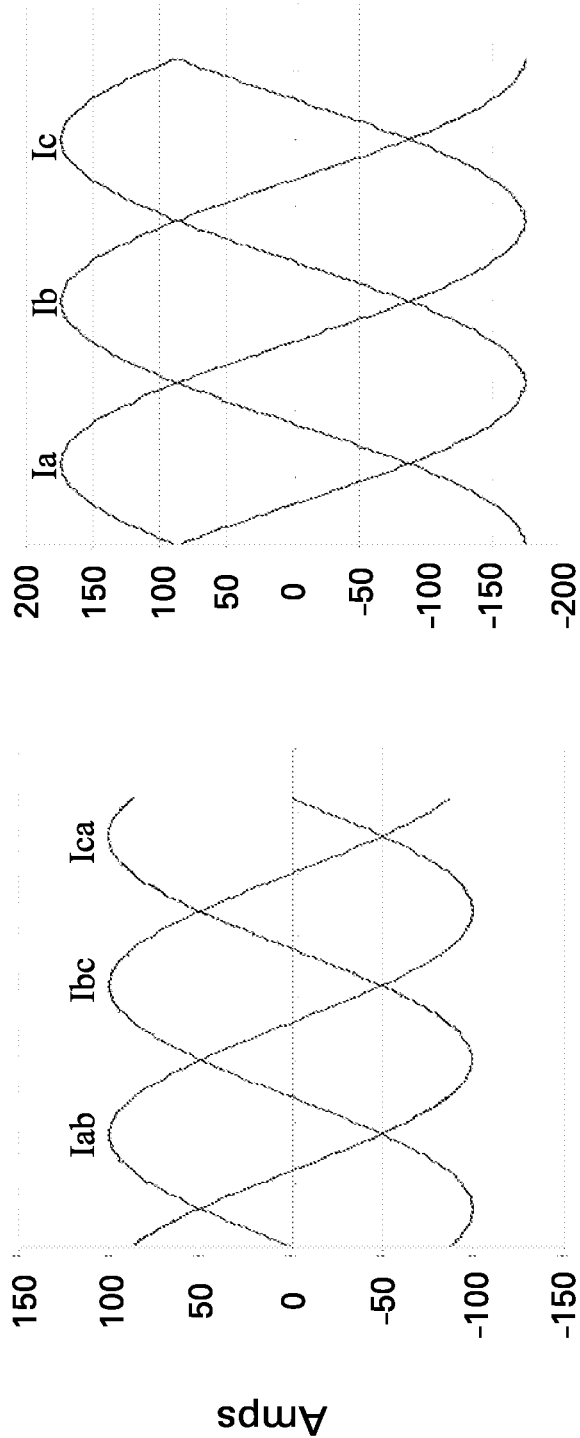
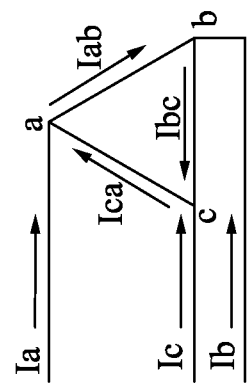
Fig. 10C (Prior Art)
Fig. 10B
Fig. 10A (Prior Art)

AC-AC CONVERTER WITH HIGH FREQUENCY LINK

STATEMENT OF GOVERNMENT INTEREST

Portions of this invention were made with government support under contract number N0001407C0415 awarded by Office of Naval Research (ONR). The government has certain rights in the invention.

BACKGROUND

Power transmission from a source to a load typically requires multiple power conversion stages such as from high voltage AC source to a lower voltage AC at the loads. Many modern power systems require large and heavy conventional transformers. The weight and volume of these transformers is a barrier to the development of expanded electrical capabilities associated with certain power system applications.

This is especially relevant with the 50 Hz and 60 Hz transformers used for many utility distribution systems as well as the electrical distribution systems associated with ships, planes, and railroads. The size of the present conversion systems impacts the placement criteria that can be problematic in space-restricted areas. The weight of the transformers not only impacts the logistics, but also impacts the operational efficiency if the heavy transformers are carried onboard.

Recent developments and designs indicate that high frequency solid state or electronic transformers are enhanced replacements for bulky line-frequency iron core transformers. High frequency switched power electronic transformers bring about significant reductions in size and weight compared to conventional line-frequency transformers. In addition, controls can be embedded to provide enhanced functionality such as fault current limiting and improved power quality.

One known approach uses rectification of the incoming AC source to a DC signal followed by a high frequency isolated DC-DC converter and then inversion back to the output AC signal. There can be multiple steps to convert the power source to the load bus. The multiple switching stages generally lead to higher losses and system cost. Another approach directly converts the incoming low frequency AC to high frequency AC, which is then fed to a transformer. The transformer secondary voltage is then reconstructed to a low frequency output. One of the disadvantages with this type of circuit design is the use of bidirectional semiconductor switches.

While there have been attempts to configure AC-AC converters used for voltage and frequency conversion, there remains continued needs for more efficient designs with improved performance.

SUMMARY OF THE INVENTION

The invention relates generally to power distribution electronics and more particularly to electronic transformers and AC-AC converter systems.

One embodiment is an AC-AC converter for a high voltage AC source, having a first rectifier section rectifying the AC source into a first pulsed DC link voltage signal with a high frequency modulating section coupled to the first pulsed DC link signal and producing a high frequency AC voltage signal. There is a high frequency transformer coupled to the high frequency AC voltage signal producing a transformed high frequency AC signal and a second rectifier section coupled to the transformed high frequency AC signal and producing a second pulsed DC voltage signal. The unfolder section is coupled to the second pulsed DC voltage signal and produces an output AC signal. A filter may be coupled in between the second rectifier section and unfolder section on the DC port and/or after the unfolder section at the AC port to remove high frequency content from the AC output voltage. Filters can also be placed on the input and/or output.

The AC-AC converter may further comprise a reactive converter section supplying a reactive current to the low voltage AC signal and the reactive converter section can be coupled to the low voltage AC signal by one of a parallel and series connection.

A further feature includes wherein the first and second rectifier sections include antiparallel switches that provide bidirectional and reactive power flow.

Another aspect of the AC-AC converter includes having a single electronic transformer cell. One embodiment includes having a single phase AC-AC converter or solid state power system that includes at least one additional series coupled or parallel coupled electronic transformer cell. Yet a further aspect is a three phase AC-AC converter or solid state power system that includes three single phase electronic transformer cells configured in delta or wye in the primary or secondary.

A further feature includes having at least one capacitor coupled between the first rectifier section and the high frequency modulating section for filtering high frequency components.

The high frequency modulating section in another embodiment has at least two series coupled transistors to each switch position of the high frequency transformer wherein at least one of the series coupled transistors can have different voltage ratings. One feature of the series coupled transistors is that they can be switched such that at least one of the transistors is inactive for at least some period of time. In other words, all the transistors do not need to be switched simultaneously. Furthermore, the series coupled transistors can be switched according to a threshold level such that only one of the transistors is active during a lower voltage region, only one of the transistors is active during a middle voltage range, and/or all of the transistors are active during peak voltages. A further feature is that the transistors active during the lower voltage region is a lower rated transistor with respect to the transistor active during the middle voltage region. Yet another aspect is that the switching is based upon a measured voltage range and/or a calculated voltage range.

One embodiment is an AC-AC converter, comprising a first rectifier section rectifying an AC source into a first pulsed DC link signal, wherein the inverter section is coupled to the first pulsed DC link signal and produces a high frequency AC signal, and wherein the inverter section has at least two transistor banks. There is a high frequency transformer coupled to the high frequency AC signal that produces a transformed AC signal, with a second rectifier section coupled to the transformed AC signal and producing a second pulsed DC link signal. An unfolder section is coupled to the first pulsed DC link signal and produces an AC signal output.

A feature of this system is wherein each bank of transistors comprises at least two transistors coupled in series. Another aspect is that at least one of the transistors has a different voltage rating. Yet a further feature includes wherein the transistors in each of the transistor bank are switched such that at least one of the transistors is inactive for at least some period of time. One aspect is that the transistors are switched according to a switching frequency and wherein a lower switching frequency is used for lower DC link signals and a higher switching frequency is used for higher DC link signals. A further feature is that the transformer peak flux level is held constant.

Yet another embodiment is a three phase AC-AC converter having three electronic transformers coupled together to convert a three phase AC signal input to a three phase AC signal output. Each of the electronic transformers can include a first rectifier section rectifying the AC signal into a first pulsed DC link signal, wherein the inverter section is coupled to the first pulsed DC link signal and produces a high frequency AC signal. A high frequency transformer is coupled to the high frequency AC signal and produces a transformed AC signal with a second rectifier section coupled to the transformed AC signal and produces a second pulsed DC link signal. There is an unfolder section coupled to the second pulsed DC link signal and produces the three phase AC signal output having a frequency and shape similar to the three phase AC signal input.

One of these features includes wherein each of the electronic transformers produces a phase current that is used to generate a line current, wherein each phase current combines a harmonic component altering the phase current, and wherein the line current remains the same. Another aspect is that the electronic transformers can be coupled to form one of a delta and wye connection on at least one of a primary and a secondary.

One embodiment is for a method for converting AC power using a single phase AC-AC converter section including receiving an input AC signal, rectifying the AC signal into a first pulsed DC link signal, modulating the first pulsed DC link signal into a high frequency link, transforming the high frequency link to a transformed voltage link, rectifying the transformed voltage link into a second pulsed DC link signal, and unfolding the second pulsed DC link signal to an output AC signal.

An additional feature of the method further comprises introducing reactive currents at the output AC signal. The method further comprises providing bidirectional and reactive power flow.

Another aspect includes stacking at least two of the three-phase AC-AC converter sections to provide for a three-phase AC source.

An additional embodiment includes modulating the rectified AC signal that includes switching among at least two transistors coupled to each switch position of a high frequency transformer. One switching feature uses a lower rated transistor for lower voltages. Another features includes modulating the rectified AC signal wherein the switching is among at least one transistor coupled to each switch position of a high frequency transformer, and wherein the switching frequency is a variable switching frequency. Yet a further feature is that variable switching frequency establishes a substantially constant magnetic flux density.

In one embodiment, the AC signal is rectified to a pulsed DC link that is then converted to a high frequency AC signal. The high frequency AC is transformer isolated and rectified to provide a pulsed DC at the secondary. This is then unfolded to an AC voltage of the same frequency and shape as the incoming AC. An optional reactive current converter can be coupled to the output to feed inductive loads since the main circuit does not typically handle reactive currents due to diode rectification.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIGS. 6a and 6b shows a single phase electronic transformer with stacked electronic transformer cells with series coupling at primary side and parallel coupling at secondary side according to one embodiment.

FIG. 8a-8c shows prior art signal waveforms of a constant switching frequency configuration.

FIG. 9a-9c shows signal waveforms for a variable switching frequency configuration according to one embodiment.

FIG. 10a shows prior art phase current waveforms.

FIG. 10b illustrates a diagrammatic perspective of the phase current calculations for the line currents for a delta-connected transformer.

FIG. 10c shows the prior art line current waveforms.

DETAILED DESCRIPTION

In general, certain embodiments of the system and techniques detailed herein provide for more efficient power conversion and in particular for AC-AC conversion. A technical effect of the system and methods herein is to provide an AC-AC converter having a high frequency link. Some advantages of the system and techniques include minimizing the number of switching devices, higher efficiency, lowering weight, reducing the need for sensors and controls, and automatic voltage sharing between series-connected modules. The systems and techniques herein provide new approaches to implementing solid state electronic transformer cells with minimized use of high frequency switching stages, optimized usage of components, and improved efficiencies.

Figure 1:
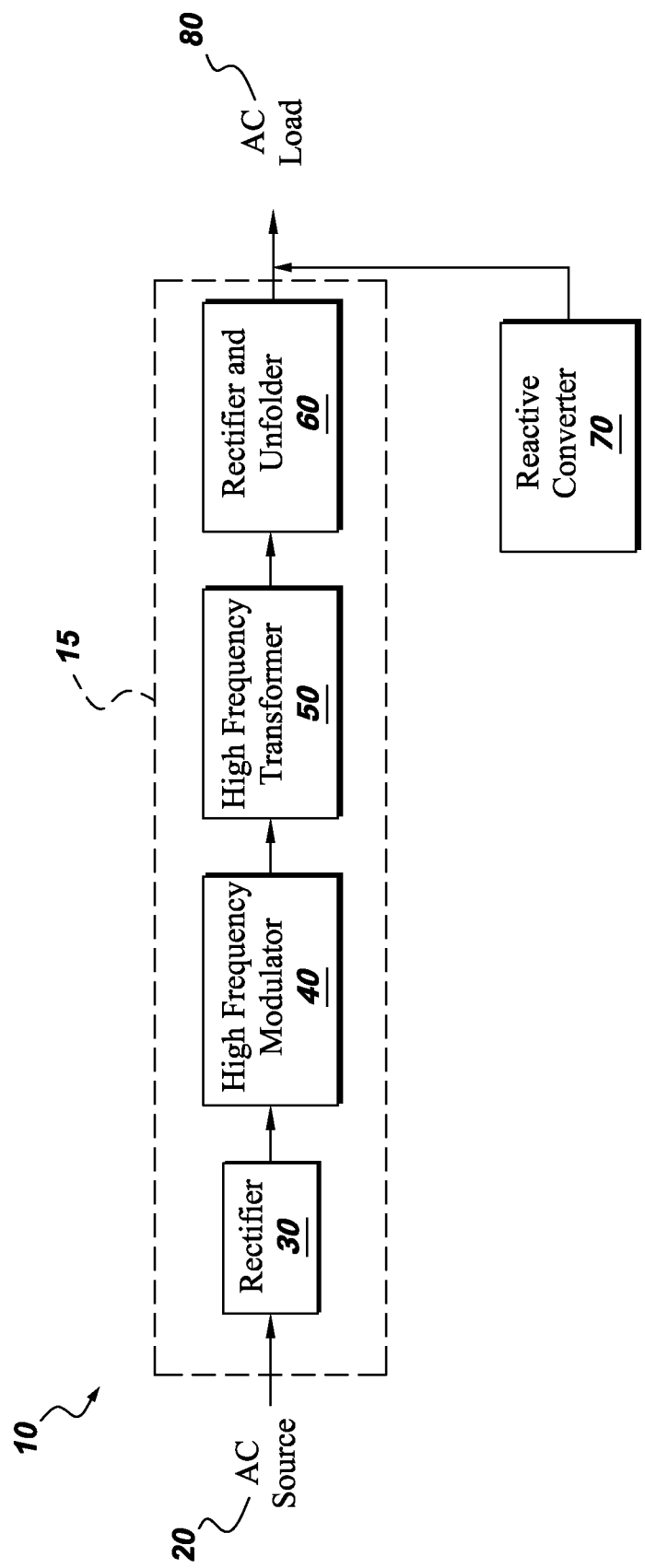
FIG. 1 is a basic block diagram illustrating an AC-AC converter system configured according to one embodiment.

One embodiment of an AC-AC conversion system 10 is shown in FIG. 1. There is some AC source 20 such as a single phase or multi-phase high voltage AC signal. There can be an input filter section (not shown) to filter the AC source 20 and condition the signal. The AC source 20 is coupled to a rectifier section 30. In this example, the rectifier section 30 is a diode rectifier that converts the AC signal into a pulsed DC link at twice the AC source frequency.

An inverter section 40 performs high frequency modulation of the rectified signal into a high frequency (HF) link. According to one embodiment the inverter section 40 contains a plurality of transistors that are switched via gate drivers and a control section to provide the high frequency link signal. The HF link signal is input to a high frequency transformer 50 that transforms the voltage level of the HF link according to the design criteria of the transformer 50 for the intended application. In this example, the high frequency link signal is transformer isolated and rectified to provide a pulsed DC at the secondary. The transformer 50 can be used to change the voltage levels between the AC source 20 and the AC load 80 such as by employing step-down transformer or step-up transformer, and also can provide approximately the same voltage level such as a unity transformer. Other transformer configurations known in the art can be integrated employing the techniques herein.

The transformed voltage signal is input to a rectifier and unfolder section 60 that rectify the HF link transformed signal and then unfolds the rectified signal to an AC signal coupled to an AC load 80, and in this example, the unfolded signal has an AC voltage of the same frequency and shape as the incoming AC source. A small filter is optionally coupled either in between the second rectifier section and unfolder section on the DC port or after the unfolder section at the AC port to remove high frequency content from the AC output voltage.

An optional reactive current converter 70 can be coupled to the rectified AC signal to feed inductive loads, if the main circuit does not process the reactive currents.

According to one embodiment, the rectifier 30, high frequency modulator 40, high frequency transformer 50, and the rectifier/unfolder 60 form an electrical equivalent of a conventional transformer such that the solid state electronic system 10 can replace the conventional transformer.

There are many alternate embodiments incorporating the system and techniques described herein. For example, one embodiment includes the replacement of the large and heavy conventional transformers, such as 60 Hz transformers, that use an intermediate high frequency switchmode transformer with the AC-AC converters and electronic transformer cells detailed herein thereby reducing size and weight.

While the power is processed through multiple stages, in one embodiment two of the conversion stages, namely the rectifier section 30 and the rectifier/unfolder 60, are highly efficient as they only switch at the low AC source frequency. In addition, since control requirements are minimal in these two stages, the system reliability is improved.

One application for the described system is to couple one or more section having switches and/or devices in series to handle the pulsed DC link. Such a coupling enables switching of the series-connected devices according to the instantaneous voltage of the pulsed DC link. For example, for 1.7 kV and 3.3 kV devices that are series-connected to build a 5 kV device, only the 1.7 kV device needs to be switched during the period when pulsed DC link voltage is below ~1200V. This provides for a more efficient system operation.

There are several embodiments incorporating unique elements into the general structure of FIG. 1 such that the operational performance is enhanced and efficiency improved as detailed herein.

Figure 2:
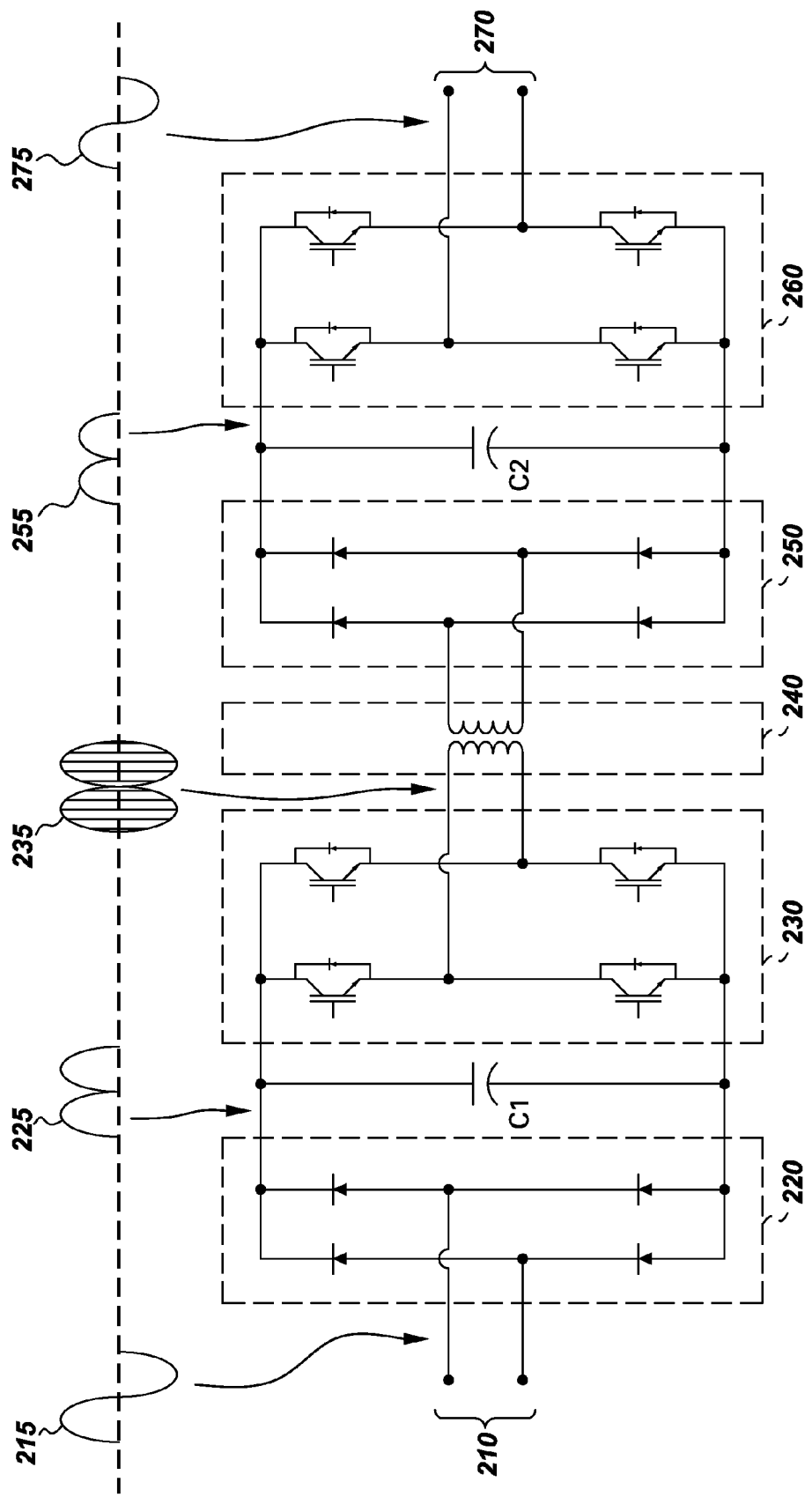
FIG. 2 is a schematic diagram showing an electronic transformer cell configured in accordance with one embodiment.

Referring to FIG. 2, a more detailed schematic presentation of one of the AC-AC electronic transformers is shown. An AC source 210 is an input to the system 200. The AC source can be an AC signal 215 having a voltage level and frequency with corresponding appropriate components according to the design criteria. For illustrative purposes, the AC signal can be a three-phase, 13.8 kV, 60 Hz signal such as used on-board certain shipping vessels, however in this example it is a single phase. While this example illustrates converting a higher input voltage to a lower output voltage, other voltage conversions are within the scope of the invention.

The input AC signal 215 is rectified by the rectifier section 220 and outputs a rectified or pulsed DC link signal 225. The capacitor C1 provides some filtering and snubbing. The capacitor C1 according to one embodiment has a low capacitance value as compared to the typical bulk capacitors to allow the DC bus to be discharged during the cycle in order to enable the pulsed rectified signal 225. By way of example, if C1 had a high capacitance value, the pulsed rectified signal 225 would not be fully discharged to zero in the cycle. Thus in this example, the capacitance value of C1 is low enough to allow the peak value to fully discharged by the load, and the pulsed signal 225 results. The rectification of the high voltage AC signal to high voltage links can be accomplished in several ways such as by silicon controlled rectifiers (SCRs) or a diode bridge. By way of example, for a 60 Hz high voltage input source, an example of diodes includes 60 Hz silicon high voltage diodes.

The rectified signal 225 is an input to the inverter section 230 that performs high frequency modulation and generates a high frequency link signal 235. The modulated signal has an envelope and pulse width according to typical pulse width modulation techniques. The inverter section 230 can be, for example, MOSFET H-bridges inverting the high voltage pulsed DC link also referred to as rectified signal 225 to high frequency AC pulse width modulated signals. The inverter section 230 can be various switching devices such as SiC MOSFET. In a further example, the high frequency link signal can be modulated at 20 kHz by an H bridge chopper circuit, which can include silicon carbide components.

A high frequency transformer 240 is coupled to the high frequency links signal 235 transforming the voltage levels between the primary and secondary according to the transformer design. In this design, the high frequency links signal is stepped down at the secondary side of the transformer 240 which outputs a transformed high frequency AC signal and is an input to the voltage rectifier section 250 producing a rectified lower voltage or second pulsed DC link signal 255.

The lower voltage rectified signal is then unfolded via the unfolder section 260 to produce the stepped down AC voltage 275 for the bus or load 270. According to one embodiment the unfolder section is a transistorized H-bridge such as Si MOSFETs.

Capacitors C2 provide some high frequency filtering and snubbing similar to C1 however these capacitors in one aspect are not the typical bulk capacitors used in DC bus circuits.

It should be readily apparent that the output voltage level and output frequency depend upon the input signal and the design of the system. There are a number of variations and further features that can be incorporated in the present designs.

Figure 3:
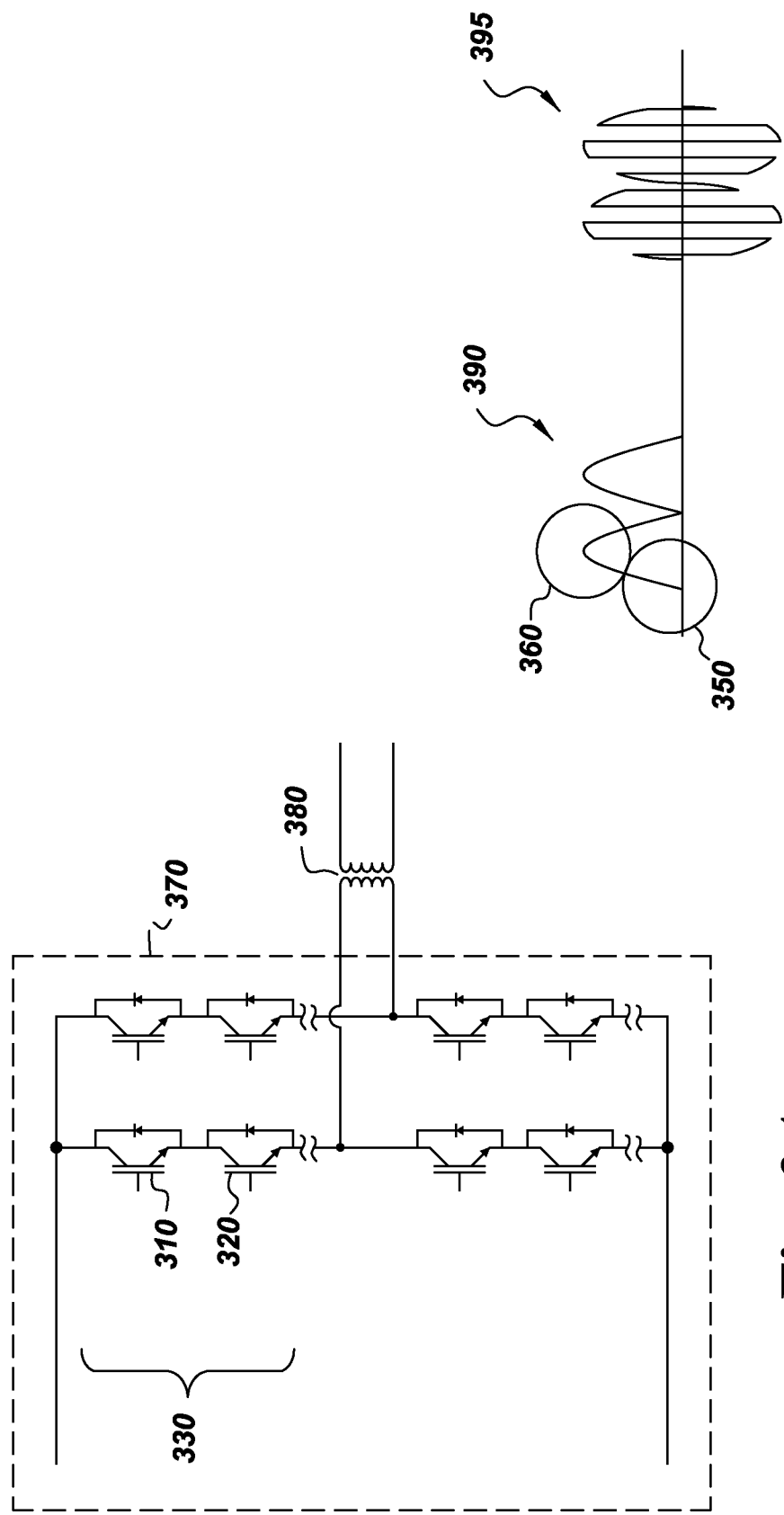
FIG. 3a is a partial schematic diagram configured in accordance with one embodiment.
FIG. 3b shows the pulsing DC link signal and the high frequency link signal.

Referring to FIG. 3a and FIG. 3b, one embodiment relates to controlling transistors, such as IGBTs, in the inverter/ converter in order to handle higher voltages and/or provide for higher switching rates. There are designs in which a single high rated transistor would not be practical or would impart drawbacks. In such applications, two transistors can be coupled in series thereby splitting the high voltage requirements required for a single transistor allowing lower rated transistors.

For example, it is known that for certain high voltage inverter applications in which a single transistor is not able to handle the pulse peak, another transistor can be coupled in series to share the load requirements. The two transistors coupled in series are typically synchronized to switch in unison and share the load equally between the transistors. These series coupled transistors are used in many implementations, and traditionally the series coupled transistors are synchronized to balance the load between the transistors. For example, with two transistors in series, the active electronics in conjunction with the gate drivers ensure that both transistors are switched On and Off in a manner so the total voltage is split equally across the two transistors.

As shown in FIG. 2 and FIG. 3b for the high voltage rectifier link 390, the high voltage DC link rectified value is not constant but rather changes over time 350, 360 such that the instantaneous voltage level goes from a low value 350 to the full load value 360 and then back down to the low level. The DC pulsating link signal 395 therefore goes through instances of higher instantaneous voltage, wherein the inverter/converter is designed to handle the highest instantaneous value and periods of much lower instantaneous values where there is ample margin for the voltage requirements.

Some of the distinguishing features of the present system include using transistors with lower voltage ratings during lower voltage periods wherein the load is not shared among all the transistors. Another feature involves switching of the transistors such as according to the voltage level and may be for less than all the transistors. These features can be used, for example, within the inverter section 230 of FIG. 2.

Referring again to FIGS. 3a and 3b, two or more transistors 310, 320 are coupled in series to form a series bank of capacitors 330. One advantage of a series bank of transistors 330 is the ability to handle higher voltages. As noted herein, the inverter section 370 operates to generate the HF link signal that is an input to the transformer 380.

For example, to handle 10 kV, each individual transistor 310, 320 could be switched to handle a portion of the load and collectively handle the entire 10 kV. In one example, each transistor 310, 320 could split the voltage and each handle the same voltage, wherein in the 10 kV example each transistor 310, 320 could be rated at 5 kV. One 5 kV transistor would be turned on during the low voltage stage until the voltage level approached the 5 kV level and then the second 5 kV transistor would be turned on to handle the higher voltage levels. In another example, three transistors in the transistor bank 330 could each have a 3.3 kV or 4 kV rating. In yet another example the transistor bank 330 can have transistors with differing voltage ratings but with a total capability to meet or exceed the load requirements. This switching approach is contrary to the conventional approach that typically switches the transistors in synchronism to share/balance the voltage in the transistors.

The threshold margins for switching can be designed according to certain design criteria and applications. For safety purposes, the transistor switching would typically be turned on prior to overloading a single transistor and in one embodiment the switching occurs when the voltage level reaches about 60% of the maximum value for a particular transistor. Likewise, the switching off of the transistors can also use a derating or safety margin. One example of the switching section (not shown) is to sense the voltage level and switch when a certain level was obtained. Another example computes the voltage level and still another example combines some sensing and some computing to derive the dynamic voltage level. The switching itself generally depends upon the gate driver and the active switching electronics.

Another feature of this system is to use less transistors and/or transistors with a lower voltage rating within the transistor bank 330 for periods having lower instantaneous voltages 350 thereby having an unbalanced or unequal split between all the transistors in the transistor bank 330. The switching control would add additional transistors as needed to handle the higher instantaneous voltages 360. For example, during the lower voltage operation 350, less transistors or low rated transistors in the transistor bank 330 are required to handle the instantaneous load 350. As the load increases 360, additional transistors and/or transistors with higher ratings can be used to handle the load. There are many benefits for the techniques detailed herein, including handling larger voltages with smaller and less expensive lower rated transistors. A further aspect relates to the faster switching of the smaller transistors and in particular to a switching scheme that can limit the number of transistors involved in the operation for lower voltages.

In one example of the present design, since there are periods of low voltage, less than the total number of transistors can be used during the periods of low voltage. In one example, the system would sense the voltage and if limits are between the range that can be handled by a single transistor then only the single transistor would be employed throughout the low voltage state. The switching and control of the transistors would depend on the gate driver and the active electronics. The load would not be balanced across other transistors during this low voltage period.

As an illustrative example, assuming the load requirements are 10 kV, and that only two IGBTs are in the transistor bank 330, namely a first transistor 310 rated at 6.5 kV and a second transistor 320 rated at 3.5 kV. The 6.5 kV transistor and 3.5 kV transistor are deployed in series, wherein during the lower voltage periods only the single 3.5 kV transistor is used. The single lower rated transistor 320 allows for faster switching and lower switching losses during the period when the second transistor 310 is not exercised.

In more particular detail, during the lower voltage levels 350, the lower rated transistor 320 is actively switched and as the voltage load increases, the 3.5 kV transistor 320 can be turned Off and the 6.5 kV transistor 310 can be turned On. If the safety margin or threshold was set at 75% of peak for the 3.5 kV transistor, the switching to the 6.5 kV transistor would occur when the voltage rose to 2.625 kV. As the voltage continues to increase, the 3.5 kV transistor 320 can be turned On to accommodate the full voltage. Similarly, as the voltage level drops, the 3.5 kV transistor 320 can be turned Off as the voltage starts to decrease. The 6.5 kV transistor 310 can then be turned Off while the 3.5 kV can be turned On at the lower levels.

Figure 4:
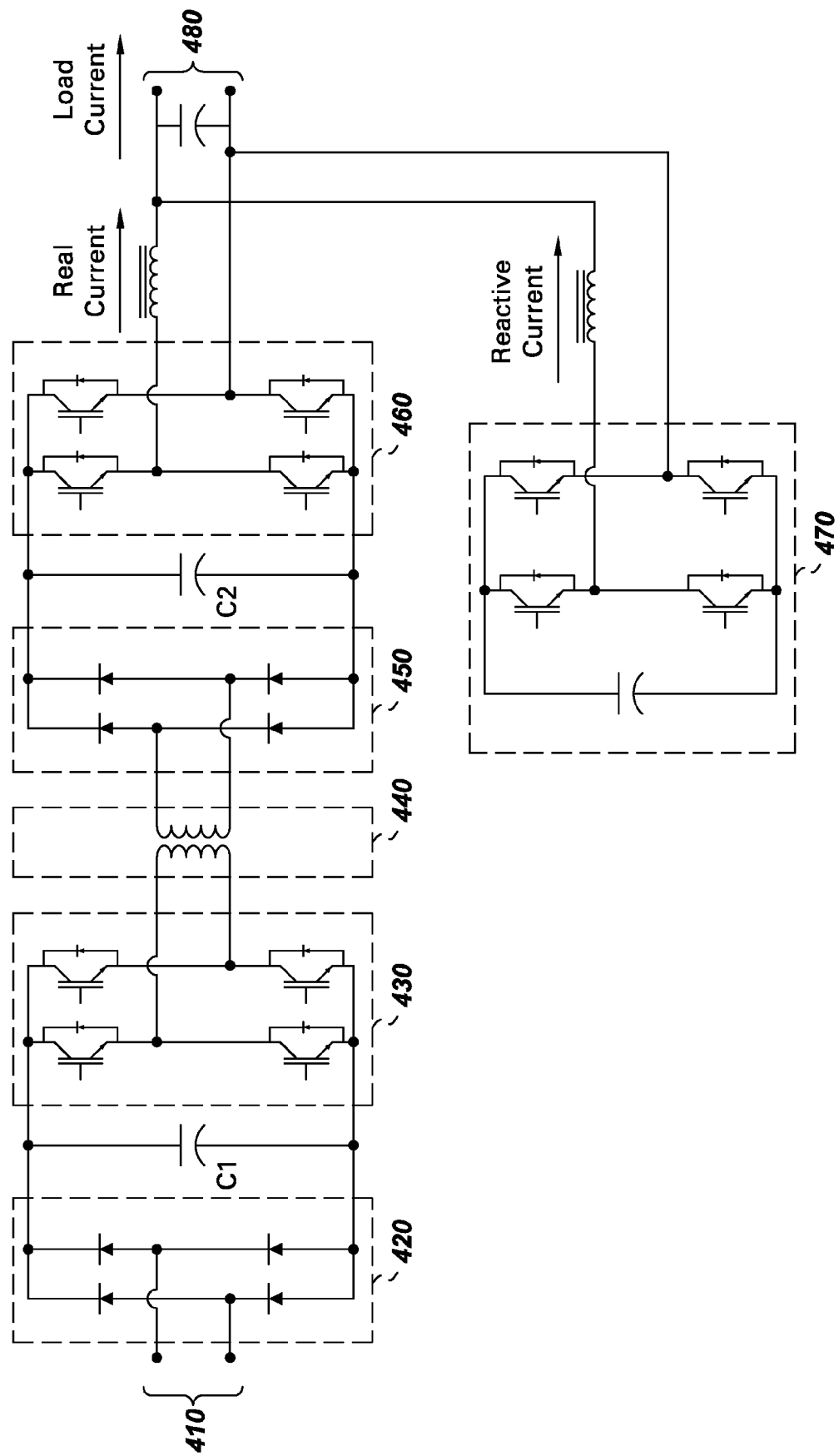
FIG. 4 is a schematic diagram showing an electronic transformer cell with reactive compensation configured in accordance with one embodiment.

The embodiment of FIG. 4 is similar to that of FIG. 2, with the addition of a reactive power section 470. The AC source 410 is rectified by the first rectifier section 420 and the rectified signal is then modulated by the modulator section 430 to produce the high frequency link signal that is then introduced to the primary of the high frequency transformer 440 that steps down the voltage at the output of the secondary of the transformer 440. The high frequency lower voltage signal is rectified by the second rectifier section 450 and the rectified signal is then unfolded by the unfolder section 460 to generate the real current AC signal delivered to the load 480. Filtering of high frequency components can be accomplished by using capacitors C1 and C2.

The AC signal from the unfolder 460 represents the real current signal as the reactive component does not get processed therein. In order to compensate for the reactive component, a reactive processing section 470 is used to process the reactive current that is then coupled to the real current AC signal to produce the load current output AC signal 480. The reactive processing section 470 can be coupled in series or parallel and supplying inductive loads.

Figure 5:
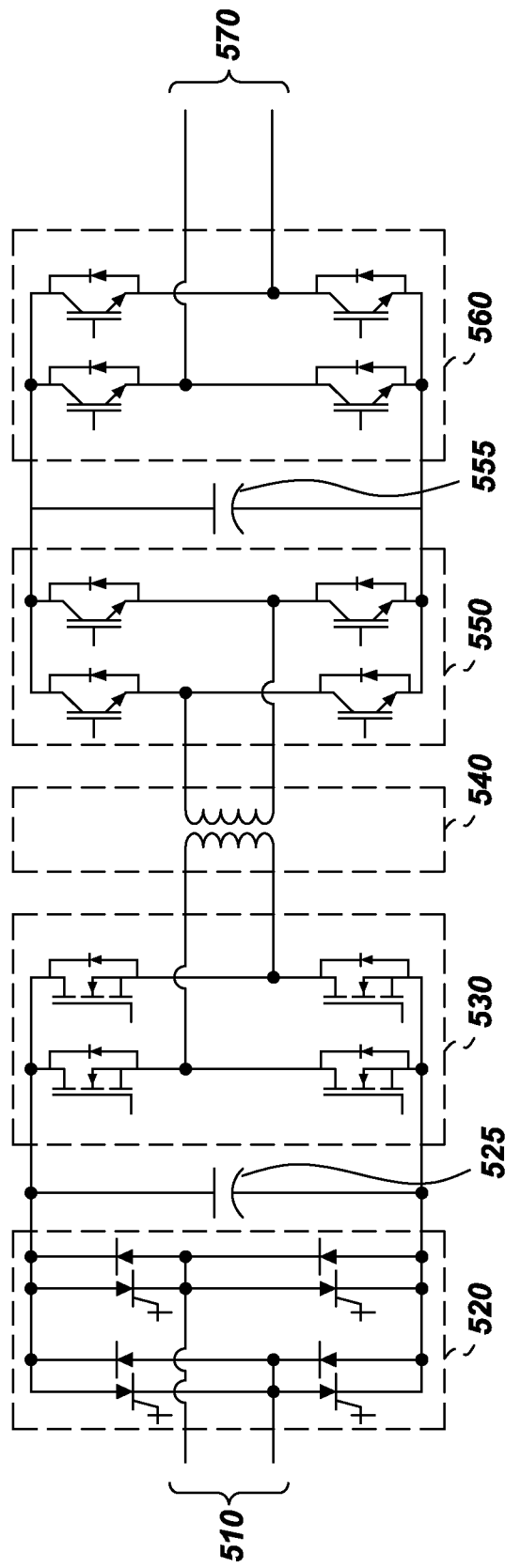
FIG. 5 is a schematic diagram illustrating an electronic transformer cell with bidirectional power flow configured in accordance with one embodiment.

FIG. 5 illustrates one embodiment for an AC-AC conversion system that is similar to the unidirectional power flow of FIG. 2 but also provides bidirectional/reactive power flow. In one example, the bidirectional power flow can be introduced by placing antiparallel switches in the rectifier sections. In this example, the first rectifier section 520 employs high voltage low frequency switches such as silicon Integrated Gate Commutated Thyristors (IGCTs) or insulated gate bipolar transistors (IGBTs) across the diodes or SCRs.

For illustrative purposes, in one example, the input signal 510 is rectified by the antiparallel switches in an inverter section that produce the DC link voltage signal that is high frequency modulated by the modulator section 530. In one aspect, to provide the bidirectional flow, Integrated Gate Commutated Thyristors (IGCTs) are opposingly coupled in parallel to the diodes in input rectifier section 520. In the modulator section 530, switching devices, such as high voltage SiC MOSFETS are utilized. The modulator section 530 in one example uses high frequency switches such as SiC IGBT or a combination of SiC MOSFET/IGBT. Capacitors 525, 555 provide snubbing and high frequency filtering are generally not bulk capacitors used in DC bus applications. In this example, the high frequency transformer 540 downconverts the voltage that is then processed by the second rectifier section 550. The rectifier components in the second rectifier section 550 are typically high frequency low voltage switches such as Si IGBT although they can also be diodes or switching transistor components such as MOSFETs. The signal is then unfolded by the transistors in the unfolder section 560 to provide the AC output 570. The low voltage low frequency switches of the unfolder 560 can be, for example, Si IGBTs.

In this particular embodiment, the power flow can be reversed with the AC output 570 becoming the AC input and the sections operating in a reverse manner to provide an AC output at the original input 510. As noted herein, in one embodiment the switching devices in the modulator section 530 differ from those in the first rectifier section 520, the second rectifier section 550 and the unfolder section 560.

One of the features of the AC-AC conversion systems described herein includes using the systems as AC-AC building block. Referring to FIGS. 6a and 6b, one example of a stacked single phase AC-AC converter system 600 is shown. In this embodiment, several AC-AC electronic transformer cells 610, 620, 630, 640 are electrically coupled to form a single-phase high voltage electronic transformer.

One embodiment configures the primary sections in series and the secondary sections in parallel that enforces voltage sharing among cells in series on the primary side and current sharing on the paralleled cells on the secondary side. Other configurations such as series coupled primary sections and series coupled secondary sections, parallel coupled primary sections and series coupled secondary sections as well as parallel coupled primary sections and parallel coupled secondary sections are further embodiments although active control may be required to ensure equal voltage and current sharing.

The electrical equivalent of the stacked converter system 600 is shown in FIG. 6(b) by the primary transformer 650 and secondary transformer 660, which represents a large conventional transformer. For some high voltage X kV that has four stacked electronic transformer cells 610, 620, 630, 640, each of the corresponding series coupled primary windings has ¼ of the high voltage X kV. On the electronic transformer secondary side, the parallel-coupled windings produce a lower voltage Y kV. The variables X and Y are used to denote some arbitrary values for illustrative purposes.

One illustrative example is one of three phase 13.8 kVac input with a 465 Vac output. The input to each primary portion of the electronic transformers carries ¼ of the 13.8 kVac. The parallel-coupled secondary windings supply $465\,\mathrm{Vac}/(\sqrt{3})$. It should be understood that the number of stacked sections can be varied to provide for the desired operational performance. Likewise, the design of the assembly components can be designed according to a desired end result.

One embodiment of the high voltage high frequency inverter section includes resonant or soft switching capability such that the transformer functions with softer edges. The soft switching feature in this example includes additional components 680 such as a series coupled inductor and capacitor. Soft switching components 680 such as an LC resonant tank circuit can be incorporated in the other cells 620, 630, 640.

Yet an additional embodiment provides for redundancy wherein the configuration in FIG. 6a depicts illustrates the switched cell 610 is bypassed by the bypass switches 685, 690, 695. In one example, there are four cells 610, 620, 630, 640 that provide the three phase output. Only three of the cells 610, 620, 630, 640 are necessary to provide the three phase output wherein one or more of the cells 610 can include bypass switching 685, 690, 695 such that if one of the other cells 620, 630, 640 experienced some failure, the additional cell 610 can be included. The switching of the cells can also be arranged for efficiency such that certain cells are used for certain loads.

Figure 7A:
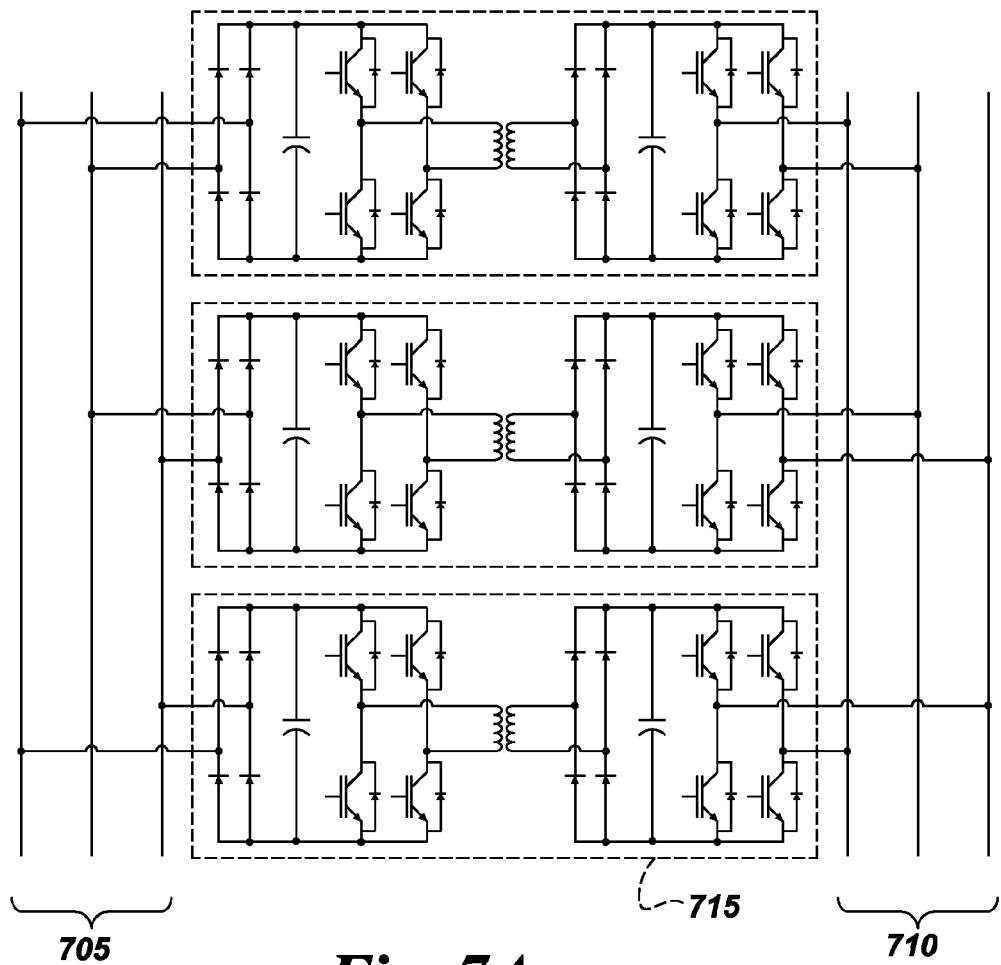
FIG. 7a is a schematic diagram illustrating a three-phase electronic transformer with three electronic transformer cells in accordance with one embodiment.

A three-phase electronic AC-AC converter or transformer is also configurable using the electronic transformer building blocks and can be configured, for example, as a three-phase delta-delta transformer such as shown in FIG. 7a.

In the example of FIG. 7a, three single-phase electronic transformers 715 are coupled to a three-phase high voltage input bus 705 that is transformed and output on a three-phase low voltage bus 710. In one embodiment, each of the single-phase transformers has a first rectifier section, inverter, high frequency transformer, second rectifier section, and unfolder section along with filtering capacitors. By coupling the transformer sections 715 in this manner, a delta-delta electrical equivalent is constructed. For convenience, the individual components of each single phase transformer namely first rectifier section, inverter, high frequency transformer, second rectifier section, and unfolder section can be referenced together as three-phase first inverter section, three-phase inverter, three-phase high frequency transformer, three-phase second rectifier section, and three-phase unfolder section. Signal processing in one embodiment is further described in FIGS. 10a-10f.

Figure 7B:
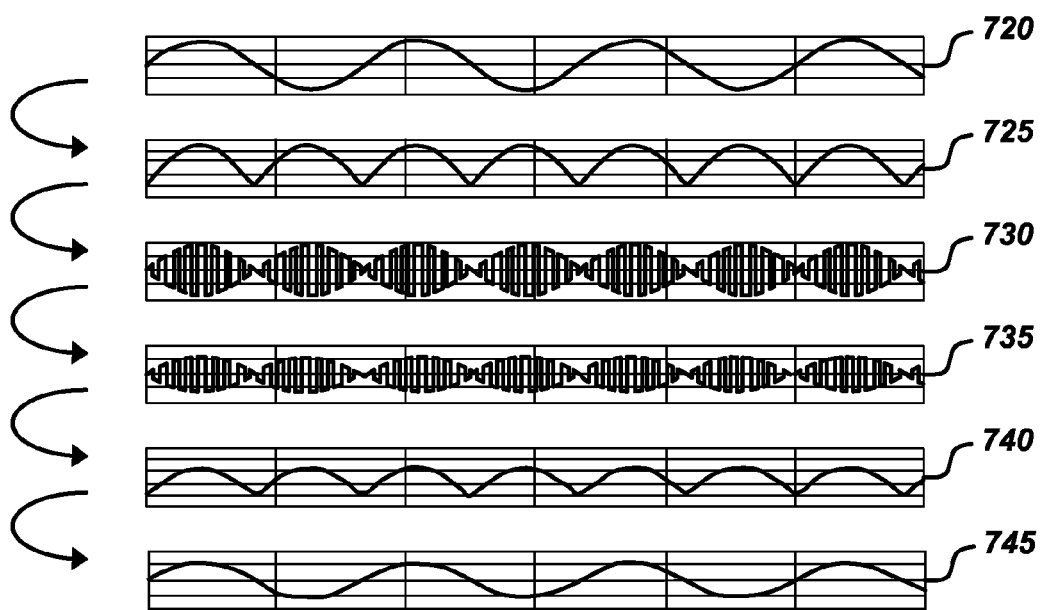
FIG. 7b shows a series of waveforms illustrating the signal transformations according to one embodiment.

A set of simulated waveforms is shown in FIG. 7b to illustrate the processing steps by observing the signal waveforms. The basic processing steps performed in each single-phase block are shown in the simulation waveforms wherein a low switching frequency has been used in this simulation to preserve clarity of representation of the waveforms.

There is a high voltage AC signal 720 that is rectified and a high voltage rectified signal 725 is generated. The rectified signal 725 is modulated into a high frequency link signal 730, such as a 20 kHz modulated waveform. The high voltage and high frequency link signal is stepped down by the high frequency transformer to produce a low voltage and high frequency transformed signal 735 that is then rectified into a rectified low voltage signal 740. Finally, the rectified signal 740 is unfolded into a low voltage AC signal 745. It should be noted that the terms high and low are relative terms and do not denote a specific value unless otherwise specified. Filtering can be accomplished by capacitors as detailed herein.

This approach basically uses the single-phase conversion blocks such as in FIG. 2. In one example, the front-end uses a simple diode rectifier with a pulsed dc bus. One of the advantages of this approach is that all high frequency switching and controls are confined to one stage. In addition to increased reliability and efficiency, this allows the system to be built with a minimum of high frequency switching devices.

Figure 7C:
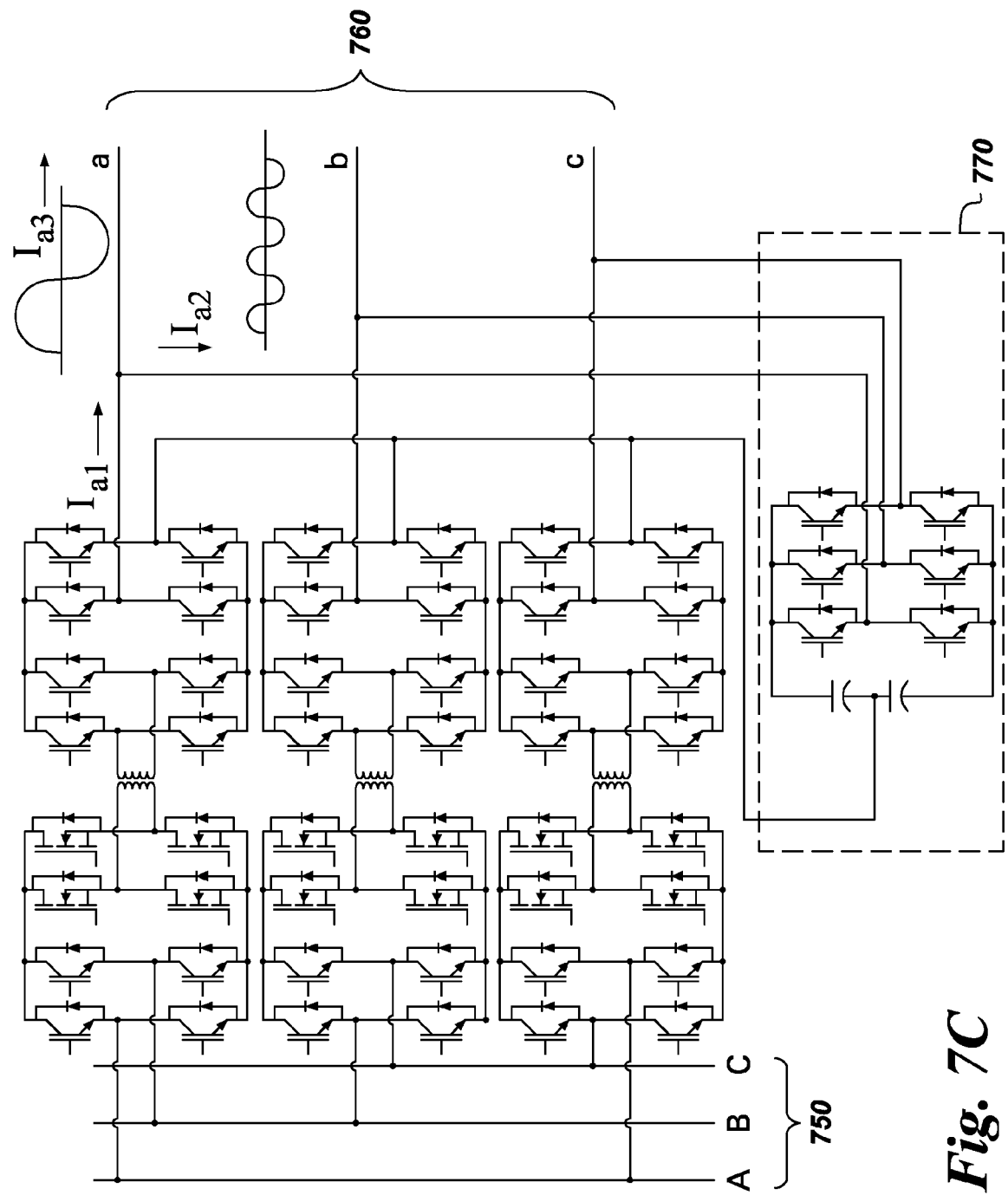
FIG. 7c is another schematic diagram illustrating a three-phase AC-AC converter system in accordance with one embodiment.
Figure 10F:
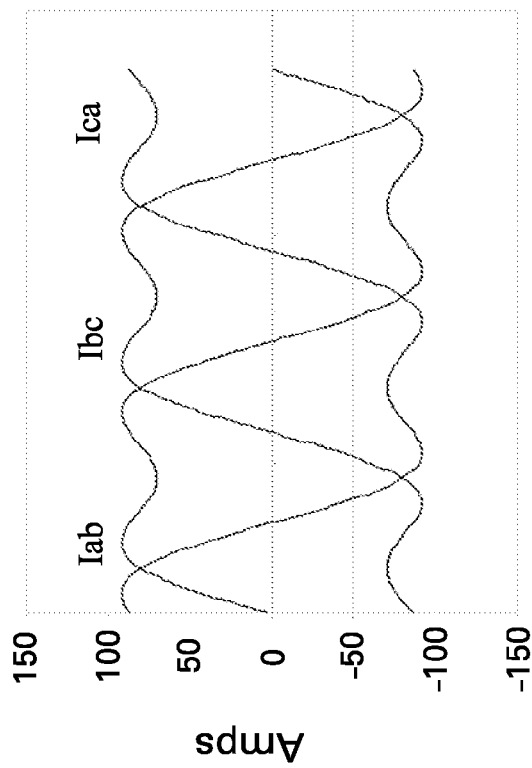
FIG. 10f shows the phase current waveforms for the manipulated internal waveforms in accordance with one embodiment.
Figure 10E:
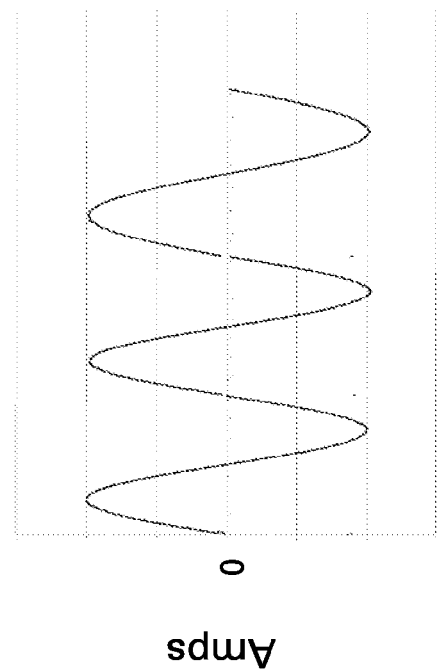
FIG. 10e shows an additional component to be combined with the primary phase current waveform of FIG. 10d in accordance with one embodiment.
Figure 10D:
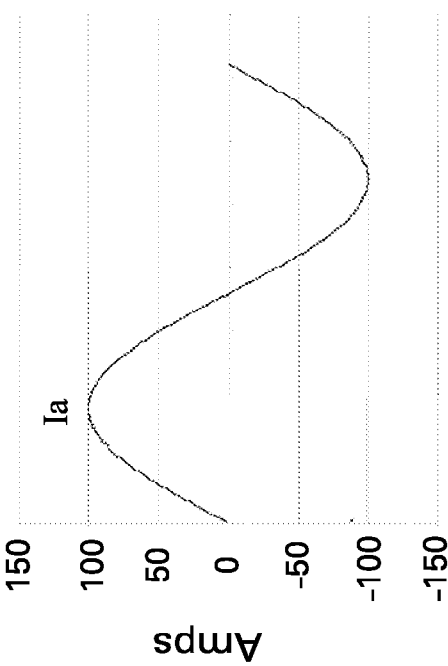
FIG. 10d shows a primary phase current waveform in accordance with one embodiment.

FIG. 7*c* illustrates a three-phase AC-AC converter system in accordance with a delta-wye configuration that reduces peak currents in the switching devices used in the electronic transformer. In delta-delta configuration of FIG. 7*a* the load currents are sinusoidal and the connection to the electronics of the secondary between the phases provides control to shed currents to provide the output. One embodiment of signal processing is shown in FIGS. 10*d*-10*f*.

Unlike the delta-delta configuration of FIG. 7*a* that is able to manipulate the incoming waveforms, the delta-wye configuration of FIG. 7*c* requires a different scheme since the same current goes through the primary and secondary and the manipulation between the phase currents is not possible. Referring to FIG. 7*c* the incoming AC signal 750 is a sinusoidal waveform and is able to provide the output AC signal 760 with clean load currents. Additional components of the zero sequence or harmonic currents are extracted by the additional inverter 770 in addition to the load currents.

In one example, if the load current is a sine wave having a certain fundamental frequency with current 'a', the zero sequence or third harmonic signal (additional component) has a frequency that is three times the fundamental frequency, with a current level that is about ⅓ of the current of the fundamental signal. At the primary side, the line currents become sinusoidal since the zero sequence currents are trapped in the primary delta connection.

It is well known that the transformer size is directly related to the magnetic flux, wherein the flux relates to an applied voltage across the windings of the transformer over a certain time period. The integration of the voltage multiplied by the time is the flux, namely, [Flux=∫Vdt]. The transformer used for a particular application needs to handle the highest flux condition along with any de-rating required for safe operation. The highest flux level would typically be the largest voltage level over a certain time interval.

For example, for a fixed DC voltage, the flux is the summation of the voltage over time, wherein the two parameters that dictate the flux establish the operating parameters. If the voltage levels are high, then the time interval needs to be short and vice-versa, if the time interval is necessarily short, the voltage levels must be kept below a certain level. If not properly addressed, the flux increases until the transformer saturates.

Referring to FIG. 8*a*, FIG. 8*b*, and FIG. 8*c*, in conventional applications, the flux operation is controlled by the pulsating DC link voltage in conjunction with a constant switching frequency. With respect to the pulsating DC voltage the magnetic flux levels roughly flows the DC link signal such that when the DC link voltage is low, the corresponding magnetic flux value integrated over the fixed time interval is also low. The upper and lower bounds of the magnetic flux are fixed by certain physical parameters of the system. The switching frequency impacts the magnetic flux as the voltage is integrated over time. And, the switching of the DC link signal changes the direction of the magnetic flux such that it oscillates between the upper and lower limits magnetic flux limits. The switching frequency has to be set to avoid saturation at the maximum values of the DC link signal such that as the flux level approaches the positive saturation point, the voltage goes negative, so the flux decreases thereby preventing saturation. Likewise, as the flux approaches saturation on the negative side, the DC link signal is reversed and the flux changes direction. There is considerable margin between the upper and lower magnetic flux limits (+/−1 Tesla in this example) and the magnetic flux values when the DC link voltage is low.

Referring to the constant switching frequency example, FIG. 8*a* shows the pulsed DC signal such as shown in FIG. 2 that is modulated by the high frequency modulating section to generate the voltage signal of FIG. 8*b* that is the voltage signal input to the transformer primary. FIG. 8*c* shows the transformer flux values and the margin 810 when the DC link values are low.

Thus in order to keep the transformer core size smaller, the flux needs to be minimized. Increasing the switching frequency allows for the voltage levels to be higher as they are integrated over a shorter time period, thereby keeping the flux low. However, the high frequency operation incurs certain negative attributes related to the switching losses that impact the overall efficiency. And, for a constant switching frequency, for example 20 kHz such as accomplished by a chopper circuit, the switching frequency must be fast enough so that at the highest voltage levels, the integrated voltage over the time period does not permit the transformer to saturate.

Referring to FIG. 9*a*, FIG. 9*b*, and FIG. 9*c* one embodiment illustrating a constant flux operation is depicted. In one example, at lower pulsed DC bus voltages, the switching frequency can be lowered thereby decreasing switching losses without increasing the transformer flux levels.

One embodiment of the present design varies the switching frequency such that there is a lower switching frequency when the voltage level is low thereby having less switching losses during that period. As the voltage level increases, the switching frequency is increased in order to maintain the flux within safe operations. Such an implementation provides a relatively constant flux level that is kept within the safe operating parameters. The time period T1 represents the time from the lowest magnetic flux level of FIG. 9*c* to the highest magnetic flux level. The time period T2 shows the smaller time that occurs as the DC link voltage approaches its maximum values and the magnetic flux values quickly achieves its upper and lower values. As previously described, upon reaching the lowest level, the bridge switches causing the DC link signal to go from negative to positive and since the flux is directly related to the voltage over time, the magnetic flux level in Figure rises from its lowest point to its uppermost point. As the magnetic flux reaches its upper value, the switching causes the DC link signal to go negative which thereby reduces the magnetic flux value.

Although there are physical upper and lower parameters, the upper and lower values for switching are design parameters and can be used to optimize performance and efficiency. The margins are minimized or eliminated, as the magnetic flux levels are approximately constant.

The switching frequency can be based on the voltage levels such that the switching frequency changes at particular levels. For illustrative purposes, for the 100 Vdc pulsed signal, if a 20 kHz switching frequency is required at the highest voltage levels in order to keep the transformer from saturating, only a 10 kHz switching frequency is required at 50 Vdc. Likewise, at 25 Vdc, the switching frequency can be 5 kHz.

In one example, an integrator can be used with some known or measured voltage level at some point with some associated scaling as necessary to compute the flux. In another embodiment, a flux sensor can be integrated with the core such that the flux level itself can be used to vary the frequency. One example computes the variable switching frequency at each switching cycle while another example computes the variable switching frequency at some other time interval. An advantage of the variable switching frequency is that there are lower switching losses in the transformer and in the transistors.

One embodiment relates to maintaining constant flux operation, wherein at lower pulsed dc bus voltages the switching frequency can be lowered without increasing transformer flux levels.

A further feature of the systems detailed herein refers to the reduction of peak stresses. For three phase systems, the transformer primary side to secondary side connections can be a coupled, for example, as delta-delta, wye-wye, delta-wye and wye-delta configurations. According to one embodiment, the peak current stresses in delta connected systems or the peak voltage stresses in devices in wye-connected systems can be reduced by introducing a zero-sequence voltage scheme. One of the advantages in reducing the peak values is that the individual components implementing the scheme can have lower device ratings.

In one delta connected configuration, a load draws a sinusoidal current and all the signals are sinusoidal at least external to the system. Inside the system, the phase currents flowing in the windings can be manipulated such that the internal current can be lowered thereby allowing lower internal device ratings.

The conventional design of FIG. 10a shows the internal phase currents in the delta connected transformer. In this example each signal is sinusoidal and has peaks at +/−100 amps.

As shown in FIG. 10b, the individual line currents are obtained by the difference of certain currents in the legs. In one example, Ia=Iab−Ica.

Referring to FIG. 10c, the output line current are depicted, namely Ia, Ib, and Ic wherein they represent the processed phase currents, and the level of the line currents equals approximately 173 amps. The processing for line current Ia as an example,

*Ia=Iab−Ica.*

According to this example, the phase current waveform is manipulated such as shown in FIG. 10f wherein the waveform includes additional components. The additional components allow for a lower peak current, which in this example shows approximately +/−85 amps. The manipulated waveform can be generated by introducing a harmonic signal and proper sequencing such that the line current output of FIG. 10d is the same. For example, assuming a 60 Hz sine wave signal such as Ia depicted in FIG. 10d. An additional component signal shown in FIG. 10e is added to the primary signal of FIG. 10d. The additional component can be, for example, a 180 Hz third harmonic with a current level about ⅓ of the level of FIG. 10d. The primary signal of FIG. 10d and the additional component of FIG. 10e are combined with zero sequencing, and the resulting waveform combinations in FIG. 10f that shows the altered phase current outputs for Iab, Ibc and Ica. However the resulting line currents Ia, Ib and Ic from the altered phase currents is the same signal shown in FIG. 10c.

In a wye configuration, a similar processing can be performed but utilizing voltage waveforms such that the modified sine waves can reproduce the line voltages.

Thus one feature incorporates manipulating the internal waveforms to lower the peak stress values (current or voltage) so it ends up with the same output waveform and output characteristics. One advantage of incorporating this scheme is that the lower rated devices can handle the lower internal peak values. Another aspect introduces the zero-sequence voltage in the primary line-neutral voltage to allow lower voltage devices to be used for a certain system line-line voltage. For example, according to simulations, the device voltage ratings in one embodiment can be reduced by about 15%.

Figure 11:
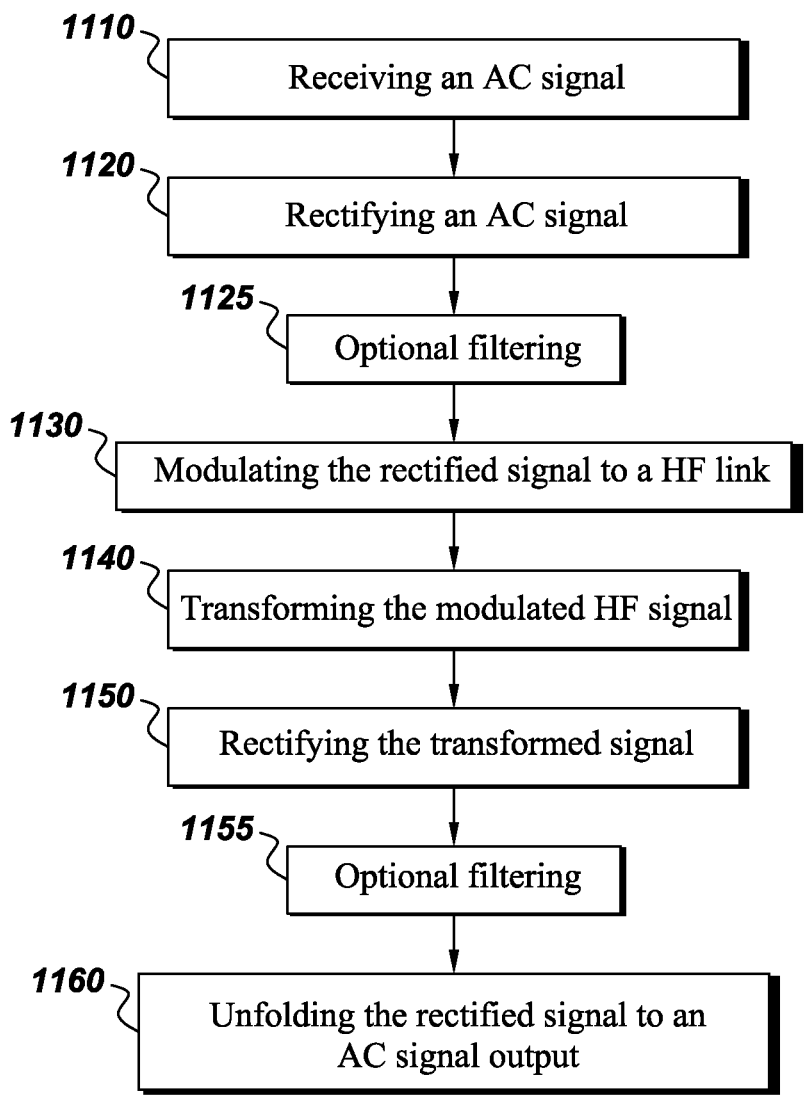
FIG. 11 is a flow chart illustrating the process flow for the AC-AC conversion system in accordance with one embodiment.

FIG. 11 shows a representative flowchart of one of the embodiments for the AC-AC conversion. Whether the AC-AC conversion is on a system or subsystem level, it commences with receiving a high voltage AC signal 1110, typically from a bus. The input signal may have some input filtering to better condition the signal for the processing.

The high voltage AC signal is rectified to generate the high voltage rectified signal 1120. The diode bridge detailed herein can be one means for rectifying the high voltage input AC signal. Optional filtering 1125 can be employed to remove certain high frequency components.

Modulating the rectified high voltage signal 1130 produces a high frequency high voltage modulated signal referred to as a high frequency link signal. One example of the modulating frequency is 20 kHz, however the modulation is not limited to a specific frequency and other frequencies can be used depending upon the input frequency, the components and the intended output frequency.

The next step refers to transforming the high frequency links signal into a lower voltage level 1140. A high frequency transformer can be utilized to step down the voltage level and the transforming is typically related to the design parameters of the transformer.

The low voltage modulated high frequency links signal is then rectified 1150 and unfolded 1160 into a low voltage AC signal. Optional filtering 1155 can be employed on the rectified signal to remove certain high frequency components.

According to a one embodiment, the present invention includes the implementation of various silicon carbide (SiC) devices, such as SiC MOSFET, SiC IGBT, SiC Schottky, PiN and JBS diodes. The overall system can be a mixed silicon-carbide (SiC) and silicon (Si) device topology. The SiC technology offer benefits, such as lower conduction and switching losses, higher voltage and higher temperature capabilities than their counterparts of Si devices and enable high density high frequency, medium voltage solid state power subsystems. One embodiment includes the power electronic transformer based on SiC wide-band-gap switching devices.

By way of practical application, one embodiment for the electronic transformer detailed herein is for the integrated power system architecture aboard ships and trains. The naval vessels used to employ a segregated ship service power bus typically fed by an auxiliary turbine and a propulsion bus typically fed by the main turbine. According to integrated power system architectures, there is a common bus fed by the main and auxiliary turbines with appropriate conversion to feed the ship service loads, weaponry, and the propulsion system. A common bus fed by the multiple turbines provides for a flexible system with improved efficiency. However, the power conversion resources require bulky and heavy transformers that may weigh several tons each to convert the high voltage AC power to the loads. Ships have limited space and smaller footprints for equipment are always preferred. In addition, gross weight tends to decrease efficiency and otherwise limit the weight that can be carried on board the ship. The replacement of conventional line-frequency transformers with high frequency electronic transformers reduces the number of active switching stages and represents substantial reductions in size and weight of the distribution transformers in an electric ship.

There are various commercial embodiments in which the electronic transformers detailed herein can be utilized. Wind energy is a clean commercially viable alternative energy source and any cost and efficiency improvements are helpful. A majority of the current wind turbines use a low voltage generator in the nacelle. The frequency converter and step-up transformer are located down-tower due to size and weight constraints and this requires multiple bulky low voltage, high current cables to be run down the length of the tower. One solution is to place the frequency converter/transformer in the nacelle that allows lighter high voltage cables to be run down the tower.

Offshore/Subsea applications are another commercial usage involving offshore oil and gas platforms and subsea oilfields, where weight and space constraints are important. For sub-sea oilfield applications, the electrical equipment is often housed in pressurized sealed containers. Often heavy components such as transformers need to be supported on special pads and foundations and shrinking the size of transformers and other conversion equipment is very desirable.

Another application relates to utility distribution networks particularly underground electrical distribution networks in dense urban areas. Due to increased load demand, transformers placed in underground vaults need to be upgraded in ratings, but are sometimes constrained to fit in the existing vault space.

One of the features compared to other solid-state transformers is the minimization of high frequency switching stages. In addition to cost reductions, the described systems alleviate problems of poor efficiencies afflicting many of the prior approaches. The described topology also uses a minimum number of switching devices, a feature that is advantageous due to limited availability of these devices in the early stages.

The electronic transformer provides significant benefits compared to conventional line-frequency transformers and the present high frequency designs. There is a significant size and weight reduction as well as lower cost due to the minimized number of active switching stages. Higher efficiency as well as lower cooling requirements are additional benefits.

Further features include lower Electro-Magnetic Interference (EMI) generation since high frequency switching is confined to one stage. There is also less control complexity and improved reliability. Switchgear requirements can be reduced. For example, controls can be used to limit fault currents or SCRs in the output stage can be used as solid-state breakers.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A single-phase AC-AC converter for an AC source, comprising:
   a first rectifier section rectifying the AC source into a first pulsed DC link voltage signal;
   a high frequency modulating section coupled to said first pulsed DC link voltage signal and producing a high frequency AC voltage signal, wherein said high frequency AC voltage signal is a modulated waveform having substantially similar amplitude to said first pulsed DC link voltage signal and having a varying switching frequency to maintain a relatively constant flux;
   a high frequency transformer coupled to said high frequency AC voltage signal producing a transformed high frequency AC voltage signal;
   a second rectifier section coupled to said transformed high frequency AC signal and producing a second pulsed DC voltage signal; and
   an unfolder section coupled to said second pulsed DC voltage signal and producing an output AC signal.

2. The AC-AC converter of claim 1 further comprising a reactive converter section supplying a reactive current to said output AC signal.

3. The AC-AC converter of claim 2 wherein said reactive converter section is coupled to said output AC signal by one of a parallel and series connection.

4. The AC-AC converter of claim 1 wherein said first and second rectifier section comprises antiparallel switches providing bidirectional and reactive power flow.

5. The AC-AC converter of claim 1 further comprising at least one additional series coupled electronic transformer forming a stacked electronic transformer.

6. The AC-AC converter of claim 1 further comprising at least one additional parallel coupled electronic transformer forming a stacked electronic transformer.

7. The AC-AC converter of claim 1 further comprising at least one capacitor coupled between said first rectifier section and said high frequency modulating section for filtering high frequency components.

8. The AC-AC converter of claim 1 further comprising at least one capacitor coupled between said second rectifier section and said unfolder section for removing high frequency components.

9. The AC-AC converter of claim 1 wherein said high frequency modulating section comprises an inverter with at least two series coupled transistors to each switch position of said high frequency transformer.

10. The AC-AC converter of claim 9 wherein at least one of said series coupled transistors has a different voltage rating.

11. The AC-AC converter of claim 9 wherein said series coupled transistors are controlled such that at least one of said transistors is not toggled for at least some period of time.

12. The AC-AC converter of claim 11 wherein said series coupled transistors are switched according to a threshold level selected from the group consisting of: only one of said transistors is toggled during a lower voltage region, only one of said transistors is toggled during a middle voltage range, and all of said transistors are toggled during peak voltages.

13. The AC-AC converter of claim 12 wherein said one of said transistors toggled during said lower voltage region is a lower voltage-rated transistor with respect to said transistor toggled during said middle voltage region.

14. The AC-AC converter of claim 12 wherein said switching is based upon at least one of a measured voltage range or a calculated voltage range.

15. The AC-AC converter of claim 1 wherein said high frequency transformer is one of a step-up transformer, a step-down transformer or a unity transformer.

16. A single-phase AC-AC converter comprising:
   a first rectifier section rectifying an AC source into a first pulsed DC link voltage signal;

an inverter section coupled to said first pulsed DC link voltage signal and producing a high frequency AC signal, wherein said inverter section is comprised of at least two transistor banks;

a high frequency transformer coupled to said high frequency AC signal producing a transformed high frequency AC signal, wherein the high frequency AC signal (235) has substantially similar amplitude to said first pulsed DC link voltage signal and is formed by applying the DC link voltage in alternating forward and reverse directions at a varying switching frequency to maintain a relatively constant flux;

a second rectifier section coupled to said transformed high frequency AC signal and producing a second pulsed DC voltage signal; and an unfolder section coupled to said second pulsed DC voltage signal and producing an AC signal output at approximately a same frequency as the AC source.

17. The AC-AC converter of claim 16 wherein each transistor bank comprises at least two transistors coupled in series.

18. The AC-AC converter of claim 17 wherein at least one of said transistors has a different voltage rating.

19. The AC-AC converter of claim 17 wherein said transistors in each said transistor bank are switched such that at least one of said transistors is not toggled for at least some period of time.

20. The AC-AC converter of claim 16 further comprising at least one additional series coupled electronic transformer forming a stacked electronic transformer.

21. A three phase AC-AC converter, comprising:
three single-phase electronic transformers coupled together to convert a three phase AC signal input to a three phase AC signal output, each of said electronic transformers comprising:
a first rectifier section rectifying said AC signal into a first pulsed DC link signal;
an inverter section coupled to said first pulsed DC link signal and producing a high frequency AC signal;
a high frequency transformer coupled to said high frequency AC signal producing a transformed high frequency AC voltage signal, wherein said high frequency AC signal is a modulated waveform having substantially similar amplitude to said first pulsed DC link signal and having a varying switching frequency to maintain a relatively constant flux;
a second rectifier section coupled to said transformed high frequency AC signal and producing a second pulsed DC link signal; and
an unfolder section coupled to said second pulsed DC link signal;
wherein said three electronic transformers produce said three phase AC signal output having a frequency and shape similar to said three phase AC signal input.

22. The converter of claim 21 wherein each said electronic transformer produces a phase current that is used to generate a line current, wherein each said phase current combines a harmonic component altering said phase current, and wherein said line current remains the same.

23. The converter of claim 21 wherein said electronic transformers are coupled to form one of a delta and wye connection on at least one of a primary or a secondary.

24. A method for converting AC power using a single phase AC-AC converter section, comprising:
receiving an input AC signal;
rectifying said input AC signal into a first pulsed DC link voltage signal;
modulating the first pulsed DC link voltage signal into a high frequency AC signal, wherein the high frequency AC signal (235) has substantially similar amplitude to said first pulsed DC link voltage and is formed by applying the DC link voltage in alternating forward and reverse directions at a varying switching frequency to maintain a relatively constant flux;
transforming said high frequency link to a transformed voltage link;
rectifying the transformed voltage link into a second pulsed DC link voltage signal; and
unfolding the second pulsed DC link voltage signal into an output AC voltage signal.

25. The method of claim 24 further comprising introducing reactive currents into said output AC signal.

26. The method of claim 24 further comprising providing bidirectional and reactive power flow.

27. The method of claim 24 further comprising at least two of said AC-AC converter sections coupled together to accommodate a higher voltage AC source.

28. The method of claim 24 wherein modulating said rectified AC signal comprises switching among at least two transistors coupled in series in each switch position.

29. The method of claim 28 wherein said switching uses a lower voltage-rated transistor for lower voltages.

* * * * *